(12) United States Patent
Grimm et al.

(10) Patent No.: US 11,155,059 B2
(45) Date of Patent: Oct. 26, 2021

(54) MULTI-LAYERED FIBRE COMPOSITE MATERIAL

(71) Applicant: Covestro Deutschland AG, Leverkusen (DE)

(72) Inventors: Thomas Grimm, Cologne (DE); Ulrich Grosser, Kürten (DE)

(73) Assignee: Covestro Deutschland AG, Leverkusen (DE)

( * ) Notice: Subject to any disclaimer, the term of this patent is extended or adjusted under 35 U.S.C. 154(b) by 490 days.

(21) Appl. No.: 15/770,651

(22) PCT Filed: Oct. 21, 2016

(86) PCT No.: PCT/EP2016/075459
§ 371 (c)(1),
(2) Date: Apr. 24, 2018

(87) PCT Pub. No.: WO2017/072053
PCT Pub. Date: May 4, 2017

(65) Prior Publication Data
US 2019/0381758 A1    Dec. 19, 2019

(30) Foreign Application Priority Data
Oct. 26, 2015  (EP) ................................... 15191418

(51) Int. Cl.
*B32B 5/12*     (2006.01)
*B32B 5/26*     (2006.01)
(Continued)

(52) U.S. Cl.
CPC .................. *B32B 5/12* (2013.01); *B32B 5/26* (2013.01); *B32B 37/06* (2013.01); *B32B 37/10* (2013.01);
(Continued)

(58) Field of Classification Search
CPC ... Y10T 428/249921; Y10T 428/24996; Y10T 428/24994; G06F 1/1601; G06F 1/1616;
(Continued)

(56) References Cited

U.S. PATENT DOCUMENTS 2,991,273 A    7/1961  Hechelhammer et al.
2,999,825 A    9/1961  Floyd et al.
(Continued)

FOREIGN PATENT DOCUMENTS

DE    1570703 A1    2/1970
DE    2036052 A1    1/1972
(Continued)

OTHER PUBLICATIONS

International Search Report for PCT/EP2016/075459 dated Jan. 16, 2017.
(Continued)

*Primary Examiner* — Camie S Thompson
(74) *Attorney, Agent, or Firm* — Faegre Drinker Biddle & Reath LLP

(57) ABSTRACT

The present invention relates to a multilayer composite, comprising at least three superimposed plies of fibre composite which are defined relative to one another as two outer plies of fibre composite and at least one inner ply of fibre composite, wherein each of these at least three plies of fibre composite comprises endless fibres, the endless fibres being unidirectionally aligned within the respective ply and embedded in a polycarbonate-based plastic, wherein the polycarbonate is selected from homopolycarbonate or copolycarbonate, the inner plies of fibre composite essentially have the same orientation and their orientation relative to the outer plies of fibre composite is rotated by 30° to 90°,
(Continued)

wherein the orientation of a ply of fibre composite is determined by the orientation of the unidirectionally aligned fibres present therein.

13 Claims, 6 Drawing Sheets

(51) Int. Cl.
  *B32B 37/06* (2006.01)
  *B32B 37/10* (2006.01)
  *B32B 37/18* (2006.01)
  *C08J 5/04* (2006.01)
  *G06F 1/16* (2006.01)

(52) U.S. Cl.
  CPC ............ *B32B 37/185* (2013.01); *C08J 5/042* (2013.01); *G06F 1/1601* (2013.01); *G06F 1/1616* (2013.01); *G06F 1/1633* (2013.01); *B32B 2260/023* (2013.01); *B32B 2260/046* (2013.01); *B32B 2262/106* (2013.01); *B32B 2457/00* (2013.01); *C08J 2369/00* (2013.01)

(58) Field of Classification Search
  CPC .. G06F 1/1633; C08J 5/04; C08J 5/042; C08J 5/24; B32B 2260/023; B32B 2260/046; B32B 2260/021; B32B 2262/106; B32B 2262/103; B32B 2262/101; B32B 2457/00; B32B 27/65; B32B 27/10; B32B 27/185; B32B 7/03; B32B 7/00; B32B 2250/03; B32B 27/36
  USPC ............... 428/221, 297.4, 299.4; 264/331.11
  See application file for complete search history.

(56) References Cited

U.S. PATENT DOCUMENTS

| | | | |
|---|---|---|---|
| 2,999,846 | A | 9/1961 | Schnell et al. |
| 3,028,365 | A | 4/1962 | Schnell et al. |
| 3,148,172 | A | 9/1964 | Fox |
| 3,189,662 | A | 6/1965 | Vaughn, Jr. |
| 3,271,367 | A | 9/1966 | Schnell et al. |
| 3,419,634 | A | 12/1968 | Vaughn, Jr. |
| 3,879,348 | A | 4/1975 | Serini et al. |
| 4,584,360 | A | 4/1986 | Paul et al. |
| 4,982,014 | A | 1/1991 | Freitag et al. |
| 5,227,449 | A | 7/1993 | Odell et al. |
| 5,288,778 | A | 2/1994 | Schmitter et al. |
| 5,821,380 | A | 10/1998 | Holderbaum et al. |
| 5,883,165 | A | 3/1999 | Kröhnke et al. |
| 9,334,607 | B2 | 5/2016 | Börger |
| 2014/0050862 | A1 | 2/2014 | Borger |
| 2014/0051310 | A1* | 2/2014 | Kunal ..................... B32B 27/30 442/1 |
| 2016/0009054 | A1 | 1/2016 | Okunaka |

FOREIGN PATENT DOCUMENTS

| | | |
|---|---|---|
| DE | 2063050 A1 | 7/1972 |
| DE | 2211956 A1 | 10/1973 |
| DE | 3334782 A1 | 10/1984 |
| DE | 3832396 A1 | 2/1990 |
| DE | 102011005462 B3 | 6/2012 |
| DE | 102012200059 A1 | 7/2013 |
| EP | 0122535 A2 | 10/1984 |
| EP | 0500496 A1 | 8/1992 |
| EP | 0839623 A1 | 5/1998 |
| EP | 2966117 A1 | 1/2016 |
| FR | 1561518 A | 3/1969 |
| GB | 1122003 A | 7/1968 |
| GB | 1229482 A | 4/1971 |
| GB | 1367790 A | 9/1974 |
| JP | 54-035781 U | 3/1979 |
| JP | S6162039 A | 3/1986 |
| JP | S6162040 A | 3/1986 |
| JP | S61105550 A | 5/1986 |
| JP | 04-125135 A | 4/1992 |
| JP | 04-096331 U | 8/1992 |
| JP | 2001-219473 A | 8/2001 |
| JP | 2008-179808 A | 8/2008 |
| JP | 2013-230579 A | 11/2013 |
| JP | 2014-506200 A | 3/2014 |
| JP | 2014-513638 A | 6/2014 |
| JP | 2014-136876 A | 7/2014 |
| JP | 2014-198837 A | 10/2014 |
| WO | WO-9615102 A2 | 5/1996 |
| WO | 2012/123302 A1 | 9/2012 |
| WO | WO-2013098224 A1 | 7/2013 |
| WO | WO-2013102590 A1 | 7/2013 |
| WO | WO-2014014813 A1 | 1/2014 |
| WO | WO-2014136876 A1 | 9/2014 |

OTHER PUBLICATIONS

International Search Report for PCT/EP2016/075462 dated Jan. 16, 2017.
Written Opinion of the International Searching Authority for PCT/EP2016/075459 dated Jan. 16, 2017.
Written Opinion of the International Searching Authority for PCT/EP2016/075462 dated Jan. 16, 2017.
"Dialead—Coal Tar Pitch-based carbon Fiber", brochure, Mitsubishi Rayon Co., Ltd., 2015, pp. 1-4.
"Pyrofil—Typical Properties of Carbon Fiber", brochure, Mitsubishi Chemical Corporation., 2018, p. 1.
International Preliminary Reporton Patentability received for PCT Patent Application No. PCT/EP2016/075459, dated May 11, 2018, 12 pages (7 pages of English Translation and 5 pages of Original Document).
International Search Report and Written Opinion received for PCT Patent Application No. PCT/EP2016/075459, dated Jan. 16, 2017, 14 pages (6 pages of English Translation and 8 pages of Original Document).
Sciti et al., "Continuous C fibre composites with a porous ZrB2 Matrix", Materials & Design vol. 85, 2015, pp. 127-134.

* cited by examiner

MULTI-LAYERED FIBRE COMPOSITE MATERIAL

CROSS-REFERENCE TO RELATED APPLICATIONS

This application is a national stage application (under 35 U.S.C. § 371) of PCT/EP2016/075459, filed Oct. 21, 2016, which claims benefit of European Application No. 15191418.1, filed Oct. 26, 2015, both of which are incorporated herein by reference in their entirety.

The present invention relates to a multilayer composite, a process for the production thereof and a housing part or a housing of an electronic device comprising such a multilayer composite.

BACKGROUND OF THE INVENTION

In recent years there has been a trend, in particular in the field of mobile electronic devices, for example mobile telephones, laptops or tablets, for producing ever lighter and thinner devices. This requires inter alia the development of extremely light and thin housings which must simultaneously exhibit high mechanical stability in order to protect the device screen and electronics. Magnesium-aluminium alloys, for example, have now become established as prior art for such purposes. The advantage of housings made of metal alloys are their low weight and their high mechanical stability. Furthermore, such metal housings are also perceived as aesthetically pleasing and upmarket by the consumer. By contrast, housings made of conventional plastic are perceived by the consumer as rather downmarket and cannot compete with the metal alloys in terms of mechanical properties either. However, the serious disadvantage of the latter is that they need to be produced from costly raw materials in complex and energy intensive processes, which is associated with high production costs. In terms of conservation of resources too, it would be desirable to develop equivalent-quality replacement materials for the metal alloys used in the prior art.

Against this background there continues to be a need to develop alternative lightweight materials which have optical, haptical, tonal, and mechanical properties similar to the housings made of metal alloys but are more cost-effective to produce.

BRIEF SUMMARY OF THE INVENTION

Proceeding from the prior art elucidated hereinabove it is an object of the present invention to provide a new material which has a metallic appearance, metallic sound, metallic haptics and metal-like mechanical properties and is suitable as a housing material for a housing of an electronic device. To this end the material should moreover be lightweight and cost-effective to produce. It would further be desirable for the material to have a surface that is as smooth and visually appealing as possible.

This object is achieved in accordance with the invention by a multilayer composite comprising at least three superimposed plies of fibre composite which are defined relative to one another as two outer plies of fibre composite and at least one inner ply of fibre composite, wherein
  (a) each of these at least three plies of fibre composite comprises endless fibres, wherein
    the endless fibres within the respective ply are unidirectionally aligned and
    are embedded in a polycarbonate-based plastic, wherein the polycarbonate is selected from homopolycarbonate or copolycarbonate,
  (b) the inner plies of fibre composite have substantially the same orientation and their orientation relative to the outer plies of fibre composite is rotated by 30° to 90°, wherein the orientation of a ply of fibre composite material is determined by the orientation of the unidirectionally aligned fibres present therein.

It was surprisingly found that the combination of the features of independent claim 1 results in a material that is characterized by a metallic appearance, metallic sound and metallic haptics and metal-like mechanical properties. The multilayer composites according to the invention furthermore have the advantage that they can be cost-effectively produced and due to the plastic used therein are extremely lightweight. The multilayer composites according to the invention moreover feature good coatability and back-injection moldability. The multi-layer composites according to the invention furthermore have the advantage that the shaping, for example of a housing part, may be effected particularly easily and flexibly due to the thermoformability of the multilayer composite.

DETAILED DESCRIPTION OF THE INVENTION

In order to improve the optics and smoothness of the surface of the multilayer composite, it has likewise proven advantageous when the multilayer composite according to the invention has a thickness ratio of the sum of the two outer plies to the sum of all inner plies of fibre composite of 0.3 to 0.65, preferably of 0.35 to 0.58, particularly preferably of 0.39 to 0.5. Practical tests have shown that these multilayer composites have reduced waviness of the surface of the multilayer composite which is associated with improved optics, smoothness and an improved coatability of the surface. In particular the surface of at least one of the outer plies of fibre composite has a quadratic average waviness (Wq) of less than 10.5 µm, preferably less than 10.0 µm, particularly preferably less than 9.5 µm, and/or an arithmetic average waviness (Wa) of less than 8.5 µm, preferably less than 8.0 µm, particularly preferably less than 7.5 µm, and/or a total height of the waviness profile on the computation length (Wt) of less than 60.0 µm, preferably less than 58.0 µm, particularly preferably less than 56.0 µm.

The invention further provides a process for producing the multilayer composite according to the invention and also provides a housing part which is suitable for use or employment in a housing of an electronic device comprising the multilayer composite.

Fibre composites find use in the prior art predominantly as lightweight materials, for example in automotive, shipbuilding, aerospace, sports and construction industries. Plastic-based fibre composites usually comprise as the main components a fibrous filler embedded in a plastic matrix.

Plastic matrix materials for fibre composites employed in the prior art are especially thermally curable thermosetting plastics, such as urea-formaldehyde resins or epoxy resins, or thermoplastic plastics, such as polyamides, polypropylene or polyethylene.

By contrast the use of polycarbonates as plastic matrix materials for fibre composites is not much in evidence. Compared to the typically employed thermoplastic plastics, polycarbonates have the disadvantage that they have little propensity for creep and thus have a tendency for cracking when under constant stress. This is highly problematic particularly for use in fibre composites comprising endless fibres. This is because fibre composites comprising endless fibres in their plastic matrix are under constant stress due to the endless fibres. Polycarbonates have therefore in practice until now played only a subordinate role as a plastic matrix for such fibre composites comprising endless fibres. It would, however, be desirable in principle to widen the field of application of polycarbonates to include composite materials because compared to the other customary thermoplastic plastics, such as polyamide or polypropylene, polycarbonates exhibit reduced volume shrinkage during curing. Polycarbonates further exhibit higher heat distortion temperatures. It was surprisingly found that precisely the use of a polycarbonate-based plastic as the plastic matrix for endless fibres in combination with the further features of independent claim 1 results in a multilayer composite according to the invention that exhibits particularly pronounced metallic haptics and optics.

The prior art discloses numerous fibre composites and processes for the production thereof. WO 2013/098224 A1 describes a process for producing a fibre composite in the form of a plastic-impregnated wide fibre band and a multilayer composite structure obtainable from sections of the wide fibre band. Both thermosetting and thermoplastic plastics may be used as the plastic matrix. DE 10 2012 200 059 A1 describes a fibre-reinforced multilayer composite having a thermoplastic plastic as the plastic matrix. However, the multilayer composites known from the prior art are severely in need of improvement in terms of their optical, tonal, haptical and mechanical properties if the concern is to better approximate the properties of housings made of metal alloys.

In the context of the present invention "composites" are to be understood as comprising finished plastic products that are already crosslinked and no longer flowable at room temperature.

In the context of the invention the term "endless fibre" is to be understood as differentiating from the short or long fibres which are also known to one skilled in the art. Endless fibres generally extend over the entire length of the ply of fibre composite. The term "endless fibres" is derived from the fact that these fibres come wound on a roll and are unwound and impregnated with plastic during production of the individual plies of fibre composite so that, save for occasional breakage or changeover of rolls, the length of said fibres typically substantially corresponds to the length of the produced ply of fibre composite.

In the context of the present invention a "polycarbonate-based plastic" is to be understood as meaning a plastic comprising at least 50 wt %, preferably at least 60 wt %, preferably at least 70 wt %, in particular at least 80 wt %, particularly preferably at least 90 wt %, very particularly preferably at least 95 wt %, in particular at least 97 wt %, of polycarbonate. Expressed another way, in the context of the present invention a polycarbonate-based plastic may comprise not more than 50 wt %, preferably not more than 40 wt %, preferably not more than 30 wt %, in particular not more than 20 wt %, particularly preferably not more than 10 wt %, very particularly preferably not more than 5 wt %, in particular not more than 3 wt %, of one or more plastics distinct from polycarbonate as blend partners.

In one particular embodiment the polycarbonate-based plastic consists substantially, in particular to an extent of 100 wt %, of polycarbonate.

When reference is made here to polycarbonate this also comprehends mixtures of different polycarbonates. Polycarbonate is furthermore used here as an umbrella term and thus comprehends both homopolycarbonates and copolycarbonates. The polycarbonates may further be linear or branched in known fashion.

In one particular embodiment of the invention the polycarbonate-based plastic consists to an extent of 70 wt %, 80 wt %, 90 wt % or substantially, in particular to an extent of 100 wt %, of a linear polycarbonate.

The polycarbonates may be produced in known fashion from diphenols, carbonic acid derivatives and optionally chain terminators and branching agents. Particulars pertaining to the production of polycarbonates have been well known to one skilled in the art for at least about 40 years. Reference may be made here for example to Schnell, Chemistry and Physics of Polycarbonates, Polymer Reviews, Volume 9, Interscience Publishers, New York, London, Sydney 1964, to D. Freitag, U. Grigo, P. R. Müller, H. Nouvertné, BAYER AG, "Polycarbonates" in Encyclopedia of Polymer Science and Engineering, Volume 11, Second Edition, 1988, pages 648-718, and finally to U. Grigo, K. Kirchner and P. R. Müller "Polycarbonate" in BeckerBraun, Kunststoff-Handbuch, Volume 31, Polycarbonate, Polyacetale, Polyester, Celluloseester, Carl Hanser Verlag Munich, Vienna 1992, pages 117-299.

Aromatic polycarbonates are produced for example by reaction of diphenols with carbonyl halides, preferably phosgene, and/or with aromatic dicarbonyl dihalides, preferably benzenedicarbonyl dihalides, by the interfacial process, optionally with use of chain terminators and optionally with use of trifunctional or more than trifunctional branching agents. Production via a melt polymerization process by reaction of diphenols with for example diphenyl carbonate is likewise possible. Diphenols suitable for producing polycarbonates are for example hydroquinone, resorcinol, dihydroxybiphenyls, bis(hydroxyphenyl)alkanes, bis(hydroxyphenyl)cycloalkanes, bis(hydroxyphenyl)sulphides, bis(hydroxyphenyl)ether, bis(hydroxyphenyl)ketones, bis(hydroxyphenyl)sulphones, bis(hydroxyphenyl)sulphoxides, α,α'-bis(hydroxyphenyl)diisopropylbenzenes, phthalimidines derived from isatin derivatives or from phenolphthalein derivatives, and also the related ring-alkylated, ring-arylated and ring-halogenated compounds.

Preferably employed diphenols are those based on phthalimides, for example 2-aralkyl-3,3'-bis(4-hydroxyphenyl)phthalimides or 2-aryl-3,3'-bis(4-hydroxyphenyl)phthalimides such as 2-phenyl-3,3'-bis(4-hydroxyphenyl)phthalimide, 2-alkyl-3,3'-bis(4-hydroxyphenyl)phthalimides, such as 2-butyl-3,3'-bis(4-hydroxyphenyl)phthalimides, 2-propyl-3,3'-bis(4-hydroxyphenyl)phthalimides, 2-ethyl-3,3'-bis(4-hydroxyphenyl)phthalimides or 2-methyl-3,3'-bis(4-hydroxyphenyl)phthalimides and also diphenols based on isatins substituted at the nitrogen such as 3,3-bis(4-hydroxyphenyl)-1-phenyl-1H-indol-2-one or 2,2-bis(4-hydroxyphenyl)-1-phenyl-1H-indol-3-one.

Preferred diphenols are 4,4'-dihydroxybiphenyl, 2,2-bis(4-hydroxyphenyl)propane (bisphenol A), 2,4-bis(4-hydroxyphenyl)-2-methylbutane, 1,1-bis(4-hydroxyphenyl)-p-diisopropylbenzene, 2,2-bis(3-methyl-4-hydroxyphenyl)propane, dimethylbisphenol A, bis(3,5-dimethyl-4-hydroxyphenyl)methane, 2,2-bis(3,5-dimethyl-4-hydroxyphenyl)propane, bis(3,5-dimethyl-4-hydroxyphenyl)sulphone, 2,4-bis(3,5-dimethyl-4-hydroxyphenyl)-2-methylbutane, 1,1-bis(3,5-dimethyl-4-hydroxyphenyl)-p-diisopropylbenzene and 1,1-bis(4-hydroxyphenyl)-3,3,5-trimethylcyclohexane.

Particularly preferred diphenols are 2,2-bis(4-hydroxyphenyl)propane (bisphenol A), 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane and dimethylbisphenol A.

These and other suitable diphenols are described for example in U.S. Pat. Nos. 3,028,635, 2,999,825, 3,148,172, 2,991,273, 3,271,367, 4,982,014 and 2,999,846, in DE-A 1 570 703, DE-A 2063 050, DE-A 2 036 052, DE-A 2 211 956 and DE-A 3 832 396, in FR-A 1 561 518, in the monograph H. Schnell, Chemistry and Physics of Poly-carbonates, Interscience Publishers, New York 1964 and also in JP-A 620391986, JP-A 620401986 and JP-A 1055501986.

In the case of homopolycarbonates only one diphenol is employed and in the case of copolycarbonates two or more diphenols are employed.

Examples of suitable carboxylic acid derivatives include phosgene or diphenyl carbonate. Suitable chain terminators that may be employed in the production of polycarbonates are monophenols. Suitable monophenols are for example phenol itself, alkylphenols such as cresols, p-tert-butylphenol, cumylphenol and mixtures thereof.

Preferred chain terminators are phenols which are mono- or polysubstituted with linear or branched, preferably unsubstituted C1 to C30 alkyl radicals or with tert-butyl. Particularly preferred chain terminators are phenol, cumylphenol and/or p-tert-butylphenol. The amount of chain terminator to be employed is preferably 0.1 to 5 mol % based on the moles of diphenols employed in each case. The addition of the chain terminators may be carried out before, during or after the reaction with a carboxylic acid derivative.

Suitable branching agents are the trifunctional or more than trifunctional compounds familiar in polycarbonate chemistry, in particular those having three or more than three phenolic OH groups.

Suitable branching agents are for example 1,3,5-tri(4-hydroxyphenyl)benzene, 1,1,1-tri(4-hydroxyphenyl)ethane, tri(4-hydroxyphenyl)phenylmethane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, tetra(4-hydroxyphenyl)methane, tetra (4-(4-hydroxyphenylisopropyl)phenoxy)methane and 1,4-bis((4',4-dihydroxytriphenyl)methyl)benzene and 3,3-bis(3-methyl-4-hydroxyphenyl)-2-oxo-2,3-dihydroindole.

The amount of the branching agents for optional employment is preferably from 0.05 mol % to 3.00 mol % based on moles of diphenols used in each case. The branching agents can either be initially charged with the diphenols and the chain terminators in the aqueous alkaline phase or added dissolved in an organic solvent before the phosgenation. In the case of the transesterification process the branching agents are employed together with the diphenols.

Particularly preferred polycarbonates are the homopolycarbonate based on bisphenol A, the homopolycarbonate based on 1,3-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane.

Copolycarbonates too may furthermore be used. To produce these copolycarbonates 1 to 25 wt %, preferably 2.5 wt % to 25 wt %, particularly preferably 2.5 wt % to 10 wt %, based on the total amount of diphenols to be used, of polydiorganosiloxanes having hydroxyaryloxy end groups may be employed. These are known (U.S. Pat. Nos. 3,419, 634, 3,189,662, EP 0 122 535, U.S. Pat. No. 5,227,449) and may be produced by methods known in the literature. Likewise suitable are polydiorganosiloxane-containing copolycarbonates; the production of polydiorganosiloxane-containing copolycarbonates is described in DE-A 3 334 782 for example.

The polycarbonates may be present alone or as a mixture of polycarbonates. It is also possible to employ the polycarbonate or the mixture of polycarbonates together with one or more plastics distinct from polycarbonate as blend partners.

Blend partners that may be employed include polyamides, polyesters, in particular polybutylene terephthalate and polyethylene terephthalate, polylactide, polyether, thermoplastic polyurethane, polyacetal, fluoropolymer, in particular polyvinylidene fluoride, polyethersulphones, polyolefin, in particular polyethylene and polypropylene, polyimide, polyacrylate, in particular poly(methyl)methacrylate, polyphenylene oxide, polyphenylene sulphide, polyetherketone, polyaryletherketone, styrene polymers, in particular polystyrene, styrene copolymers, in particular styrene acrylonitrile copolymer, acrylonitrile butadiene styrene block copolymers and polyvinyl chloride.

Optionally present in addition are up to 10.0 wt %, preferably 0.10 to 8.0 wt %, particularly preferably 0.2 to 3.0 wt %, of other customary additives.

This group comprises flame retardants, anti-drip agents, thermal stabilizers, demoulding agents, antioxidants, UV absorbers, IR absorbers, antistats, optical brighteners, light-scattering agents, colourants such as pigments, including inorganic pigments, carbon black and/or dyes, and inorganic fillers in amounts customary for polycarbonate. These additives may be added individually or else in a mixture.

Such additives as are typically added in the case of polycarbonates are described, for example, in EP-A 0 839 623, WO-A 96/15102, EP-A 0 500 496 or "Plastics Additives Hand-book", Hans Zweifel, 5th Edition 2000, Hanser Verlag, Munich.

A multilayer composite in the context of the present invention comprises at least three super-imposed plies of fibre composite material.

"Fibre composite" is to be understood in accordance with the invention as meaning a composite comprising endless fibres embedded in a plastic matrix. In a preferred embodiment of the invention the multilayer composite comprises at least three superposed and surficially interjoined plies of fibre composite.

The inventive plies of fibre composite of the multilayer composite comprise endless fibres unidirectionally aligned within the respective ply and embedded in a polycarbonate-based plastic. These endless fibres in particular extend substantially over the entire length of the ply of fibre composite.

In one particular embodiment of the invention all fibre composite plies of the multilayer composite are joined face-to-face, wherein within the respective ply the endless fibres are unidirectionally aligned and embedded in a polycarbonate-based plastic. In this embodiment further material plies may optionally be present between the fibre composite plies.

In addition to the plies of fibre composite the multilayer composite according to the invention may also comprise one or more further plies. Examples that may be mentioned here are further plies of a plastic which may be identical or different from the plastic matrix used in the plies of fibre composite. These plastic plies may in particular also comprise fillers which are distinct from the endless fibres provided in accordance with the invention. The multilayer composite according to the invention may furthermore also comprise adhesive plies, woven plies, nonwoven plies or surface-enhancement plies, for example coating layers.

These further plies may be present between inner and outer plies of fibre composite, between a plurality of inner plies of fibre composite and/or atop one or both of the outer plies of fibre composite. However it is preferable when the outer plies of fibre composite and the at least one inner ply of fibre composite are interjoined such that there are no further plies therebetween. Practical tests have shown that the multilayer composite according to the invention exhibits advantageous mechanical properties and metallic haptics and optics even without such further interposed material plies. In a further embodiment of the invention all fibre-comprising plies of the multilayer composite are fibre composite plies according to the invention which comprise endless fibres unidirectionally aligned within the respective ply and embedded in a polycarbonate-based plastic. The multilayer composite may also be composed exclusively of fibre composite plies according to the invention which comprise endless fibres unidirectionally aligned within the respective ply and embedded in a polycarbonate-based plastic, wherein one or more surface-enhancement plies, for example coating layers, may optionally be present atop one or both of the outer plies of fibre composite.

It has proven advantageous in the context of the present invention when the multilayer composite comprises six, preferably five, in particular four, particularly preferably three, inner fibre composite plies. However, the multilayer composite according to the invention may also comprise two or more than six, for example seven, eight, nine, ten or more than ten inner fibre composite plies.

The individual plies of fibre composite may have a substantially identical or different construction and/or orientation.

A "substantially identical construction" of the fibre composite plies is to be understood as meaning in the context of the invention that at least one feature from the group comprising chemical composition, fibre volume content and layer thickness is identical.

"Chemical composition" is to be understood as meaning the chemical composition of the plastic matrix of the fibre composite and/or the chemical composition of the endless fibres.

In a preferred embodiment of the invention the outer plies of fibre composite have a substantially identical construction in terms of their composition, their fibre volume content and their layer thickness.

According to the invention an "outer ply" of fibre composite is to be understood as meaning the fibre composite ply which comprises endless fibres unidirectionally aligned within the ply and embedded in a polycarbonate-based plastic and which is in each case outermost relative to the other fibre composite plies of the multilayer composite. "Inner plies" in the context of the invention are thus all fibre composite plies located between the two outer plies. It is expressly included within the scope of this invention that one or more further material plies, for example one or more plastic plies, a facing/veneer and/or coating layers, may be located externally to the outer plies of fibre composite.

"Unidirectional" in the context of the invention is to be understood as meaning that the endless fibres are substantially unidirectionally aligned, i.e. point in the same direction lengthwise and thus have the same running direction. "Substantially unidirectional" is to be understood in this context as meaning that a deviation in the fibre running direction of up to 5% is possible. However, it is preferable when the deviation in the fibre running direction is markedly below 3%, particularly preferably markedly below 1%.

Examples of endless fibres suitable in accordance with the invention are glass fibres, carbon fibres, basalt fibres, aramid fibres, liquid crystal polymer fibres, polyphenylene sulphide fibres, polyether ketone fibres, polyether ether ketone fibres, polyether imide fibres and mixtures thereof. The use of glass fibres or carbon fibres has proven particularly practical.

In a particularly preferred embodiment of the invention the fibres employed are carbon fibres.

It has proven particularly practical for certain embodiments of the invention to use endless fibres, in particular carbon fibres, having a modulus of elasticity of more than 240 GPa, preferably more than 245 GPa, particularly preferably of 250 GPa or more. Such carbon fibres are commercially available from Mitsubishi Rayon CO., LtD. under the trade name Pyrofil. Practical tests have shown that these carbon fibres feature particularly good spreadability during processing to afford a fibre composite ply according to the invention.

It is within the scope of the invention that further plies may be applied atop the outer ply of fibre composite, wherein these plies may be further fibre composite plies, plastic plies or coating layers for example, wherein the fibre composite plies that may be applied atop the outer plies of fibre composite contain no endless fibres unidirectionally aligned within the ply and embedded in a polycarbonate-based plastic.

In one particular embodiment of the invention the at least three plies of fibre composite are arranged in substantially symmetrical fashion, wherein the two outer plies of fibre composite have a substantially identical construction in terms of one feature from the group comprising chemical composition, fibre volume content and layer thickness.

"Substantially symmetrical" in the context of the invention is to be understood as meaning that the fibre composite plies of the multilayer composite have a substantially identical construction, in terms of at least one feature, preferably all features, from the group comprising chemical composition, fibre volume content and layer thickness, about a mirror plane extending parallel to the plies of fibre composite over half of the thickness of the multilayer composite outwardly delimited by the two outer plies of fibre composite.

In a preferred embodiment of the invention the at least three plies of fibre composite are arranged substantially symmetrically, wherein the two outer plies of fibre composite have a substantially identical construction in terms of all features from the group comprising chemical composition, fibre volume content and layer thickness. In a further particularly preferred embodiment of the invention the at least three plies of fibre composite are symmetrically arranged, wherein the two outer plies of fibre composite have an identical construction.

In a preferred embodiment of the invention the multilayer composite has a total thickness of 0.5 to 2 mm, preferably 0.8 to 1.8 mm, in particular 0.9 to 1.2 mm. Practical tests have shown that the multilayer composite according to the invention can achieve excellent mechanical properties even at these thin thicknesses.

It has proven particularly advantageous when the sum of all internal plies of fibre composite has a total thickness of 200 µm to 1200 µm, preferably 400 µm to 1000 µm, particularly preferably 500 µm to 750 µm.

It is furthermore advantageous in the context of the invention when the thickness of each of the two outer plies of fibre composite is 100 to 250 µm, preferably 120 µm to 230 µm, particularly preferably 130 µm to 180 µm, respectively.

In terms of mechanical properties it was surprisingly found in the context of the invention that particularly good results are established when the multilayer composite according to the invention has a thickness ratio of the sum of the two outer plies to the sum of all inner plies of fibre composite of 0.3 to 0.65, preferably of 0.35 to 0.58, particularly preferably of 0.39 to 0.5. It was surprisingly found that a multilayer composite having the abovementioned thickness ratio of the sum of the two outer plies to the sum of all inner plies exhibits further improved mechanical properties compared to a multilayer composite not having this thickness ratio. In particular it is for instance possible with the abovementioned thickness ratio to obtain multilayer composites which exhibit a sufficiently high modulus of elasticity for use as a housing part for electronic devices in measurements as per the methods described in the experimental part both at 0° and at 90°.

In one particular embodiment of the invention a fibre composite ply has a fibre volume content of ≥30 vol % and ≤60 vol %, preferably ≥35 vol % and ≤55 vol %, particularly preferably of ≥37 vol % and ≤52 vol %. If the fibre volume content is less than 30 vol % then the mechanical properties of the resulting fibre composite under a point load are often suboptimal, i.e. the fibre composite cannot adequately withstand a point load and in some cases is even pierced. A fibre volume content of over 60 vol % likewise results in a deterioration of the mechanical properties of the fibre composite. Without wishing to be bound to any scientific theories the reason for this seems to be that the fibres can no longer be adequately wetted during impregnation at such high fibre volume contents thus leading to an increase in air inclusions and to increased occurrence of surface defects in the fibre composite.

In one embodiment of the invention the outer plies of fibre composite have a fibre volume content of not more than 50 vol %, preferably not more than 45 vol %, in particular not more than 42 vol %.

In one particular embodiment of the invention the outer plies of fibre composite have a fibre volume content of at least 30 vol %, preferably at least 35 vol %, in particular at least 37 vol %.

These upper and lower limits for the fibre volume content are associated with particularly advantageous mechanical properties as described hereinabove.

In a further particular embodiment of the invention the outer plies of fibre composite have a lower volume content of fibres based on the total volume of the ply of fibre composite than the at least one inner ply of fibre composite.

The inner plies of fibre composite can have a fibre volume content of 40 to 60 vol %, preferably 45 to 55 vol %, particularly preferably 48 to 52 vol %, based on the total volume of the ply of fibre composite.

"Vol %" is to be understood in this context as meaning the volume fraction (% v/v) based on the total volume of the ply of fibre composite.

It has proven particularly practical when the inner plies of fibre composite have the same orientation and their orientation relative to the outer plies of fibre composite is rotated by 90°. It is also conceivable however to rotate the inner plies by 30°, 40°, 50°, 60°, 70° or 80° relative to the outer plies. In each case this orientation may deviate from the recited guide values by ±5°, preferably by ±3°, particularly preferably by ±1°.

The fibre composite plies of the multilayer composite according to the invention may be produced by the customary processes for producing fibre composites known to one skilled in the art.

Particularly good results in terms of mechanical properties and surface smoothness are established when the following production process is used: In a preferred embodiment of the invention the fibre composite plies of the multilayer composite are producible by applying a molten polycarbonate-based plastic onto an endless fibre band preheated to above the glass transition temperature of the plastic with application of pressure-shear vibration. Such a production process is described in DE 10 2011 005 462 B3.

It was surprisingly found that the thus produced fibre composite plies feature a particularly low proportion of air inclusions and very good mechanical properties despite the use of a polycarbonate-based and thus stress-cracking-prone plastic. The multilayer composite according to the invention obtainable from the thus produced fibre composite plies exhibits not only metallic haptics and optics but also very good mechanical properties, particularly in respect of point loads.

The at least three plies of fibre composite of the multilayer composite according to the invention preferably comprise essentially no voids, in particular essentially no air inclusions.

"Essentially no voids" is in one embodiment to be understood as meaning the void content of the at least three plies of fibre composite of the multilayer composite according to the invention is below 2 vol %, in particular below 1 vol %, particularly preferably below 0.5 vol %.

The void content of a fibre composite ply or of the multilayer composite may be determined in different ways which are regarded as generally accepted. For example the void content of a test specimen may be determined by the resin ashing test where a test specimen is exposed for example to a temperature of 600° C. for 3 hours in an oven in order to incinerate the resin which encloses the fibres in the test specimen. The mass of the thus exposed fibres may then be determined in order to arrive after a further computational step at the void content of the test specimen. Such a resin ashing test may be performed as per ASTM D 2584-08 to determine the individual weights of the fibres and of the polymer matrix. The void content of the test specimen may be determined therefrom in a further step by utilizing equation 1 which follows:

$$V_f=100*(\rho_t-\rho_c)/\rho_t \quad \text{(equation 1)}$$

where
$V_f$ is the void content of the sample in [%];
$\rho_c$ is the density of the test specimen, determined by liquid or gas pycnometry for example;
$\rho_t$ is the theoretical density of the test specimen determined as per equation 2 which follows $$\rho_t=1/[W_f/\rho_f+W_m/\rho_m] \quad \text{(equation 2)}$$

$\rho_m$ is the density of the polymer matrix (for example for an appropriate crystallinity);
$\rho_f$ is the density of the fibres used;
$W_f$ is the weight fraction of the fibres used and
$W_m$ is the weight fraction of the polymer matrix.

Alternatively, the void content may be determined by chemical dissolution of the polymer matrix out of the test specimen as per ASTM D 3171-09. The resin ashing test and the chemical dissolution method are more suitable for glass fibres which are generally inert to melting or chemical treatment. Further methods for more sensitive fibres are indirect computation of the void content by the densities of the polymer, of the fibres and of the test specimen as per ASTM D 2734-09 (method A), wherein the densities may be determined as per ASTM D792-08 (method A). It is also possible to employ image processing programs, grid templates or defect counting to evaluate the void content of an image recording determined by conventional microscopy.

A further way to determine void content is the thickness difference method which comprises determination of the layer thickness difference between a theoretical component thickness and the actual component thickness for known basis weights and densities of polymer and fibre. Computation of the theoretical component thicknesses assumes no voids present in the construction and complete wetting of the fibres with polymer. Relating the thickness difference to the actual component thickness affords the percentage void content. These thicknesses may be measured with a micrometer for example. For this method, error-minimized results may preferably be determined by determining the void content on components composed of a plurality of individual layers, preferably more than 4 layers, particularly preferably more than 6 layers and very particularly preferably more than 8 layers.

While all of the above described processes result in comparable results when co-testing an appropriate standard the void contents as described here were determined by the thickness difference method as reported in the examples.

It is very particularly preferable when the three plies of fibre composite of the multilayer composite according to the invention comprise no voids, in particular no air inclusions.

An "endless fibre band" is to be understood in accordance with the invention as meaning a plurality of rovings that have been brought together, wherein the rovings are untwisted bundles of many endless fibres.

The preferred process for producing a fibre composite ply of the multilayer composite comprises in particular the steps of:
  providing an endless fibre band and conveying the endless fibre band along a processing line,
  preheating the endless fibre band to a processing temperature higher than the glass transition temperature of the polycarbonate-based plastic,
  applying the molten polycarbonate-based plastic over an entire width of the endless fibre band onto one surface of the endless fibre band,
  applying a pressure on to the endless fibre band perpendicular to the plane of the band after the application of the polycarbonate-based plastic, wherein the application of pressure is effected with at least one pressing ram with simultaneous application of shear vibration to the pressing ram with a vibratory motion component in the band plane and transverse to a band running direction,
  holding the endless fibre band within a processing temperature range above the glass transition temperature of the polycarbonate-based plastic at least until the application of pressure-shear vibration has been terminated.

Melt application with the following application of pressure-shear vibration for as long as the dry fibre band is at a temperature above the glass transition temperature of the polycarbonate-based plastic results in an efficacious incorporation of the plastic melt into the entire fibre volume structure of the dry fibre band. It is preferable not to exceed an endless fibre band temperature of 380° C. The temperature of the endless fibre band is typically between 180° C. and 260° C., preferably between 200° C. and 240° C., particularly preferably between 210° C. and 230° C., in particular 220° C. When reference is made to heating to above the glass transition temperature of the plastic or holding at above the glass transition temperature of the plastic this is to be understood as meaning heating to a temperature at which the plastic is in a fully molten state. The glass transition temperature of the plastic may be determined as per DIN EN ISO 17025. A difference between the fibre temperature and the melt temperature on contacting of the plastic melt with the endless fibre band is in the range from 60° C. to 120° C., preferably from 70° C. to 110° C., particularly preferably from 80° C. to 100° C. The application of pressure-shear vibration causes efficient expulsion of gas volumes still present within the dry fibre band. The process may be performed in continuous fashion. The holding of the endless fibre band at a temperature above the glass transition temperature of the plastic ensures that the polycarbonate-based plastic does not undergo undesired solidification before complete penetration and apportioning within and atop the endless fibre band. This maintaining of a temperature above the glass transition temperature of the plastic may be continued after termination of the application of pressure-shear vibration during a resting interval. Once the indicated process steps have been performed the produced, impregnated endless fibre band may be cooled in a defined manner. The endless fibre band may comprise a multiplicity of endless fibres. The application of pressure-shear vibration makes it possible to achieve good plastic penetration of the fibre band, i.e. good impregnation, with little, if any, damage to the fibres.

It is particularly preferable when the process for producing a fibre composite ply of the multilayer composite is run such that the application of the polycarbonate-based plastic to the endless fibre band is effected while the endless fibre band is conveyed under ambient atmospheric pressure. Such an application of the plastic avoids complex and inconvenient external sealing of a pressurized application chamber.

It is furthermore preferable to run the process for producing a fibre composite ply of the multilayer composite such that the application of pressure-shear vibration to a section of the endless fibre band after plastic application is effected consecutively and repeatedly along the processing line. It is also possible to run the process such that the application of pressure-shear vibration to a section of the endless fibre band after plastic application is effected from both sides of the band plane. Repeated application of pressure-shear vibration increases the efficiency of the production process. Transverse motion components of the various devices for application of pressure-shear vibration may be controlled in synchronized opposing fashion, i.e. in a push-pull manner. A rest interval where the dry fibre band does not have a pressure and/or shear vibration applied to it for a predefined time interval may in each case be provided in a targeted fashion between the consecutive applications of pressure-shear vibration. An application of pressure-shear vibration from both sides may be effected by way of pressure application devices arranged consecutively in the processing line. Alternatively, a simultaneous application of pressure-shear vibration from both sides is possible. The application of pressure-shear vibration from both sides can also be effected with the transverse motion components occurring in synchronized opposing fashion, i.e. in a controlled push-pull manner.

The frequencies of the application of pressure-shear vibration may be in the range between 1 Hz and 40 kHz. Amplitudes of the application of pressure-shear vibration may be in the range between 0.1 mm and 5 mm. A pressure of the application of pressure-shear vibration may be in the range between 0.01 MPa and 2 MPa.

The invention further provides a method for producing a multilayer composite according to the invention, comprising the steps of:
- providing at least one inner ply of fibre composite and two outer plies of fibre composite, wherein the production of the individual fibre composite plies is effected by applying a molten polycarbonate-based plastic onto an endless fibre band preheated to above the glass transition temperature of the plastic with application of pressure-shear vibration,
- introducing the at least one inner ply of fibre composite between the outer fibre composite plies, wherein the inner plies of fibre composite have the same orientation and their orientation relative to the outer plies of fibre composite is rotated by 30° to 90°,
- joining the layered plies of fibre composite, in particular by means of pressure and/or temperature, to afford the multilayer composite.

"Joining the layered plies of fibre composite" is to be understood in accordance with the invention as meaning any process which results in a physical joining of the layered plies of fibre composite. It is preferable when the joining of the layered plies of fibre composite to afford the multilayer composite is effected by means of pressure and/or temperature, for example by lamination. The pressure employed for joining the layered plies of fibre composite to afford the multilayer composite may be in the range from 5 to 15 bar, preferably 7 to 13 bar, particularly preferably 8 to 12 bar. The temperature for joining the fibre composite plies may be 80° C. to 300° C. If a joining process with heating and cooling zones is employed the temperature for joining the fibre composite plies in the heating zones may be from 220° C. to 300° C., preferably from 230° C. to 290° C., particularly preferably from 240° C. to 280° C. The temperature in the cooling zones may be from 80° C. to 140° C., preferably from 90° C. to 130° C., particularly preferably from 100° C. to 120° C.

However, in addition to lamination, adhesive bonding or welding to join the layered plies of fibre composite are also possible.

In a preferred embodiment the joining of the layered plies of fibre composite results in face-to-face joined plies of fibre composite. "Face-to-face" in this context is to be understood as meaning that at least 50%, preferably at least 75%, 90%, 95%, 99% or 100% ("uniform" joining) of the surfaces of two adjacent plies of the fibre composite that are facing one another are directly interjoined. The degree of joining may be determined in sections by microscopy or else determined by the absence of cavities, for example air inclusions, in the fibre composite.

Producing a housing part suitable for use as, or employment in, a housing of an electronic device involves performing the steps of:
a) providing a multilayer composite according to the invention as starting material,
b) forming and/or assembling with further components to afford the housing part.

A housing part in the context of the invention is any part suitable for use as, or employment in, a housing of an electronic device (IT housings). For example a housing part in the context of the invention may be the back of a mobile telephone, the underside of a laptop, the monitor backside of a laptop, the back of a tablet etc. or else may be only a constituent of a back of a mobile telephone, an underside of a laptop, monitor backside of a laptop, a back of a tablet etc.

In a particular embodiment the housing part is the monitor backside (so-called "a-cover") or the underside of a laptop (so-called "d-cover") or is a constituent of the monitor backside or of the underside of a laptop.

A further advantage of the multilayer composite according to the invention is that it may be formed into any desired shape. Forming may be achieved by any forming processes known to one skilled in the art. Such forming processes may be effected under the action of pressure and/or heat.

In one embodiment of the process according to the invention the forming is effected under the action of heat, in particular by thermoforming.

The invention further provides a housing part which is suitable for use as, or employment in, a housing of an electronic device, wherein the housing part comprises a multilayer composite according to the invention or is obtainable by the process for producing a housing part according to the invention and wherein the housing of an electronic device is preferably the monitor backside or the underside of a laptop.

The present invention further provides an electronic device, in particular a computer, monitor, tablet or telephone comprising a multilayer composite according to the invention or obtainable by a process for producing a housing part, wherein the computer is preferably a laptop.

In order to be used as the housing of an electronic device or in a housing of an electronic device the multilayer composite according to the invention should be able to withstand a point load such as is generated for example when an electronic device is dropped or is unintentionally trodden on. The multilayer composites according to the invention not only have a surprisingly metallic appearance, metallic sound and metallic haptics but are also particularly resistant to point loads. This makes them particularly suitable for use in IT housings.

It was surprising to find that a multilayer composite according to the invention having a modulus of elasticity combination in the 0° direction of more than 55 GPa and a modulus of elasticity in the 90° direction of more than 28 GPa meets the point loadability requirements demanded of a housing of an electronic device particularly well. A multilayer composite according to the invention preferably has a modulus of elasticity combination in the 0° direction of more than 60 GPa and a modulus of elasticity in the 90° direction of more than 30 GPa. As is illustrated in the exemplary embodiments this selection rule may be observed especially by adjustment of the relative layer thicknesses in the multilayer composite and/or of the fibre volume contents.

The invention also provides a fibre composite ply comprising unidirectionally aligned endless fibres embedded in a polycarbonate-based plastic. This polycarbonate-based plastic is preferably a linear polycarbonate and the unidirectionally aligned endless fibres preferably have a modulus of elasticity of more than 240 GPa. Practical tests have shown that such fibre composite plies are particularly amenable to further processing to afford multilayer composites according to the invention having excellent mechanical properties.

Further details and advantages of the invention are apparent from the description which follows of the accompanying illustration showing preferred embodiments.

BRIEF DESCRIPTION OF THE DRAWINGS

FIG. 1 shows a portion of a multilayer composite 1 made of three superposed plies of fibre composite 2, 3, wherein the inner ply of fibre composite 2 is rotated by 90° relative to the outer plies 3 of fibre composite. The enlarged detail in FIG. 1 shows that each of the plies 2, 3 of the multilayer composite comprises endless fibres 4 which are unidirectionally aligned within the respective ply and are embedded in polycarbonate-based plastic 5. The orientation of the respective ply of fibre composite 2, 3 is determined by the orientation of the unidirectionally aligned endless fibres 4 present therein. The endless fibres 4 extend over the entire length/width of the multilayer composite. The layers 2, 3 are uniformly interjoined.

The multilayer composite 1 as per FIG. 2 is made of five superposed plies of fibre composite 2, 3, wherein the inner plies of fibre composite 2 have the same orientation and their orientation relative to the outer plies of fibre composite 3 are rotated by 90°.

The multilayer composite 1 as per FIG. 3a is made of six superposed plies of fibre composite 2, 3, wherein the inner plies of fibre composite 2 have the same orientation and their orientation relative to the outer plies of fibre composite 3 are rotated by 90°. For a thickness of each individual ply of the outer plies 3, and a thickness of each individual ply of the inner plies 2, of 170 µm for example, the thickness ratio of the sum of the two outer plies 3 to the sum of the inner plies 2 is (2·170 µm)/(4·170 µm)=0.5.

FIG. 3b shows a multilayer composite 1 made of three superposed plies of fibre composite 2, 3, wherein the inner ply 2 has a greater thickness than the sum of the two outer plies 3. For a thickness of each individual ply of the outer plies 3 of 170 µm and a thickness of the inner ply 2 of 680 µm for example, the thickness ratio of the sum of the two outer plies 3 to the sum of the inner ply 2 is (2·170 µm)/680 µm=0.5. The thickness ratio of the sum of the two outer plies 3 to a thick inner ply 2 as per FIG. 3b is thus the same as the thickness ratio of the sum of the two outer plies 3 to the sum of the four inner plies 2 of the multilayer composite 1 from FIG. 3a.

The multilayer composite 1 as per FIG. 4 is made of three superposed plies of fibre composite 2, 3, wherein the outer plies of fibre composite 3 have a lower fibre volume content than the inner plies of fibre composite 2. This is shown here in schematic form such that the density of the endless fibres 4 in the outer plies of fibre composite 3 is lower compared to the fibre density in the inner ply of fibre composite 2/that the proportion of the plastic 5 in the outer plies of fibre composite 3 is correspondingly higher compared to the proportion of the plastic in the inner fibre composite plies 2.

FIG. 5a shows the multilayer composite 1 made of three superposed plies of fibre composite 2, 3 as described for FIG. 1 but with an additional further outer material ply 6 atop one of the outer plies of fibre composite 3. The outer material ply 6 may for example comprise one or more fibre-free plastic plies and/or a thin facing, for example a coating layer or a veneer.

FIG. 5b shows a multilayer composite 1 made of three superposed plies of fibre composite 2, 3 as described for FIG. 1 but with two additional further inner material plies 7, wherein a respective inner further material ply 7 is located between one of the outer plies 3 of fibre composite and the inner ply 2 of fibre composite respectively. The further inner material plies 7 may have an identical or different construction and may comprise for example one or more fibre-free plastic plies.

FIG. 6 shows a schematic representation of a laptop. The housing part of the laptop which forms the monitor backside a of the monitor b is also referred to in the art as an "a-cover". The housing part of the laptop which forms the underside d of the keyboard c is typically referred to as a "d-cover". The monitor backside a and the underside d of the laptop comprise the multilayer composite according to the invention.

LIST OF REFERENCE SYMBOLS

Figure 1:
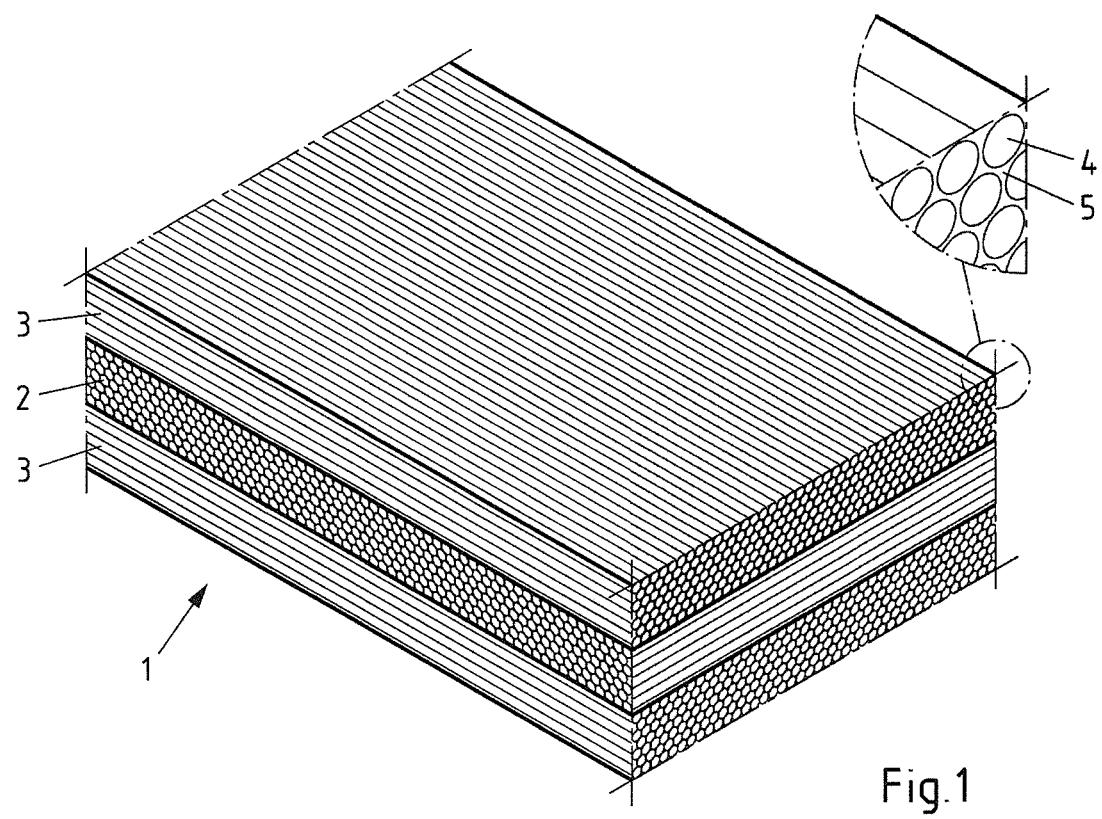
FIG. 1 shows a schematic and perspective depiction of a multilayer composite made of three superposed plies of fibre composite with enlarged detail, wherein the inner ply is rotated by 90° relative to the outer plies of fibre composite.
Figure 2:
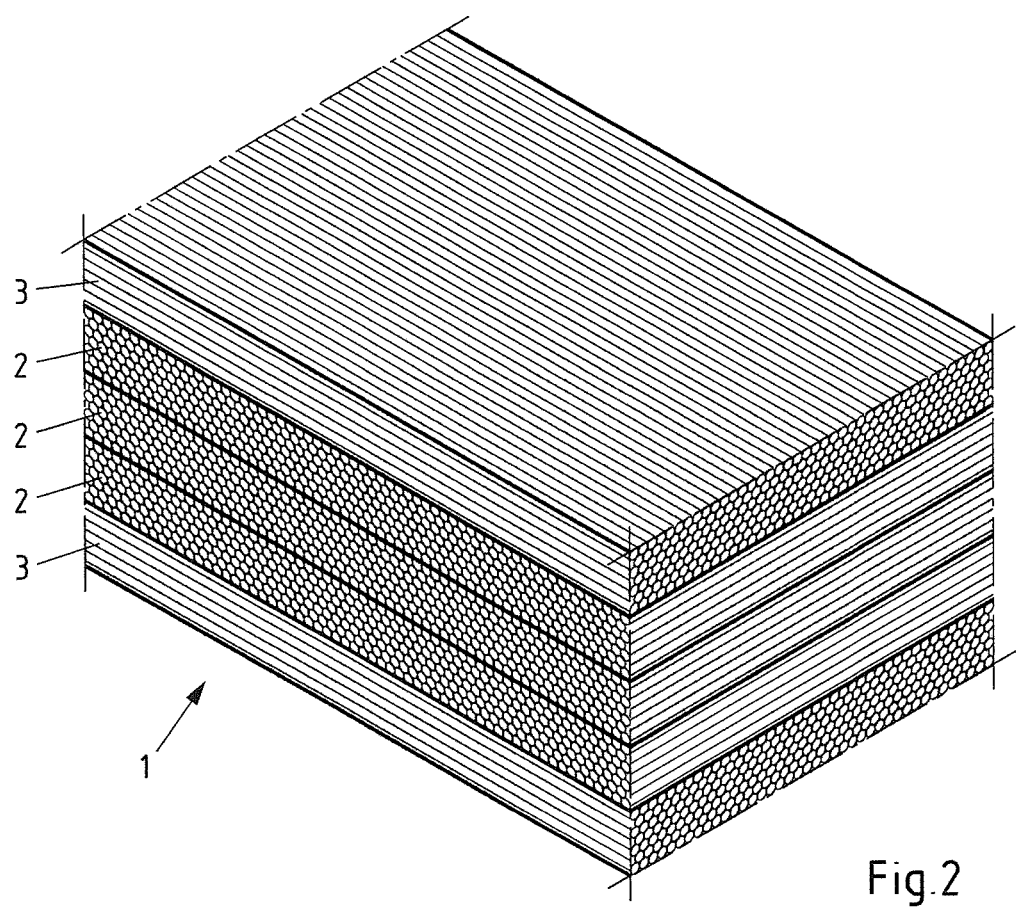
FIG. 2 shows a schematic and perspective depiction of a multilayer composite made of five superposed plies of fibre composite, wherein the inner plies have the same orientation and their orientations relative to the outer plies of fibre composite are rotated by 90°.
Figure 3A:
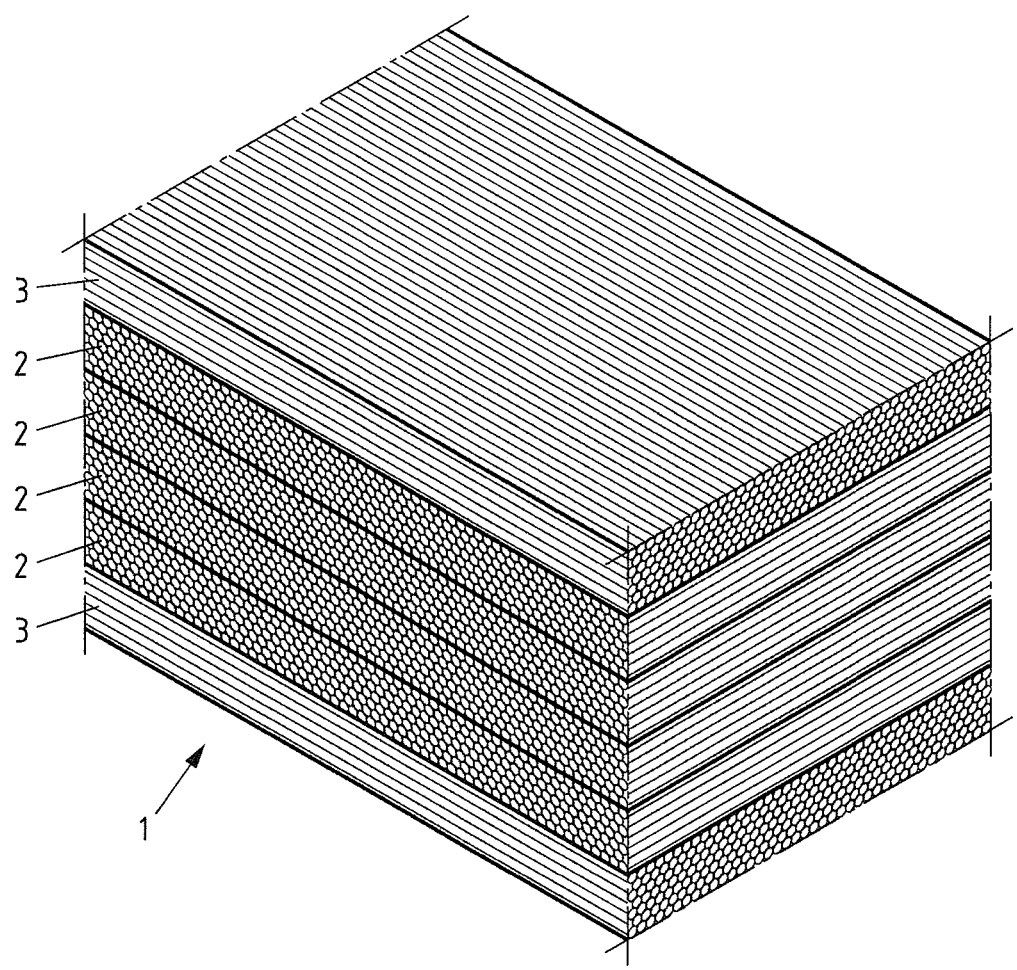
FIG. 3a shows a schematic and perspective depiction of a multilayer composite made of six superposed plies of fibre composite, wherein the inner plies have the same orientation and their orientations relative to the outer plies of fibre composite are rotated by 90°.
Figure 3B:
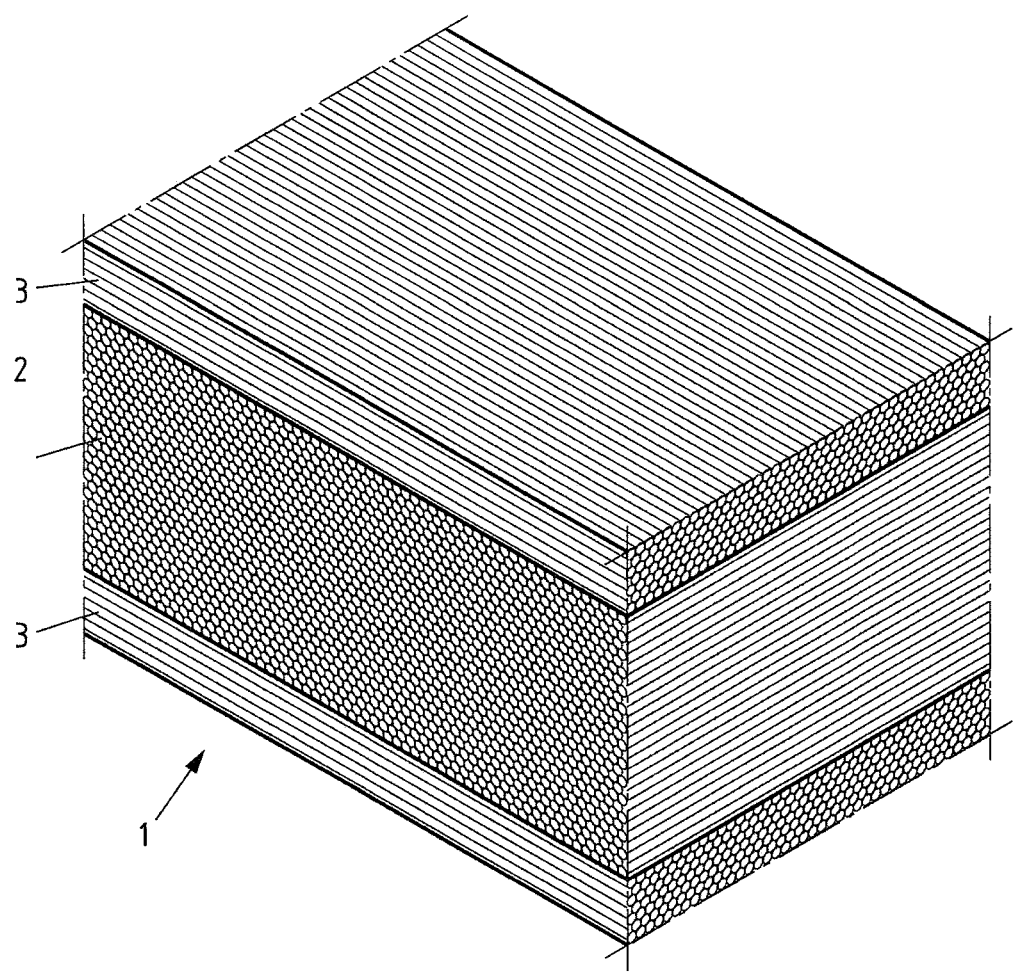
FIG. 3b shows a schematic and perspective depiction of a multilayer composite made of three superposed plies of fibre composite, wherein the inner ply has a greater thickness than the sum of the two outer plies. The thickness ratio of the inner ply to the sum of the two outer plies is the same as the thickness ratio of the sum of all inner plies to the sum of the two outer plies of the multilayer composite from FIG. 3A.
Figure 4:
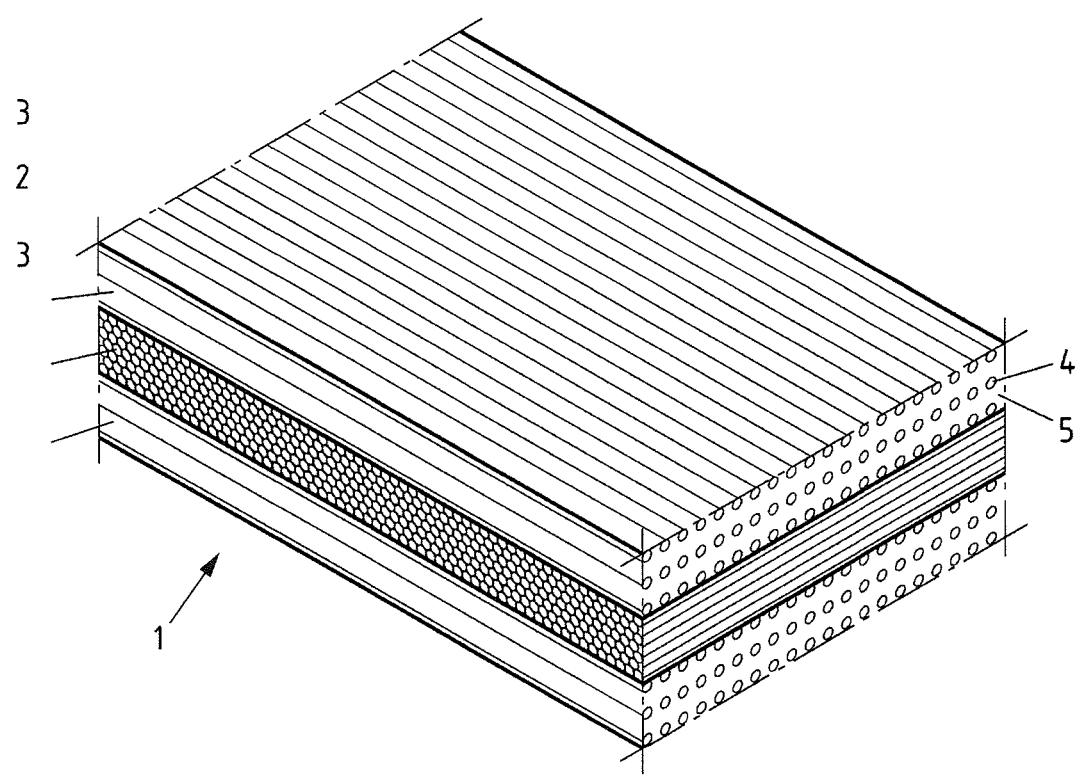
FIG. 4 shows a schematic and perspective depiction of a multilayer composite made of three superposed plies of fibre composite, wherein the outer plies of fibre composite have a lower fibre volume content than the inner plies of fibre composite.
Figure 5A:
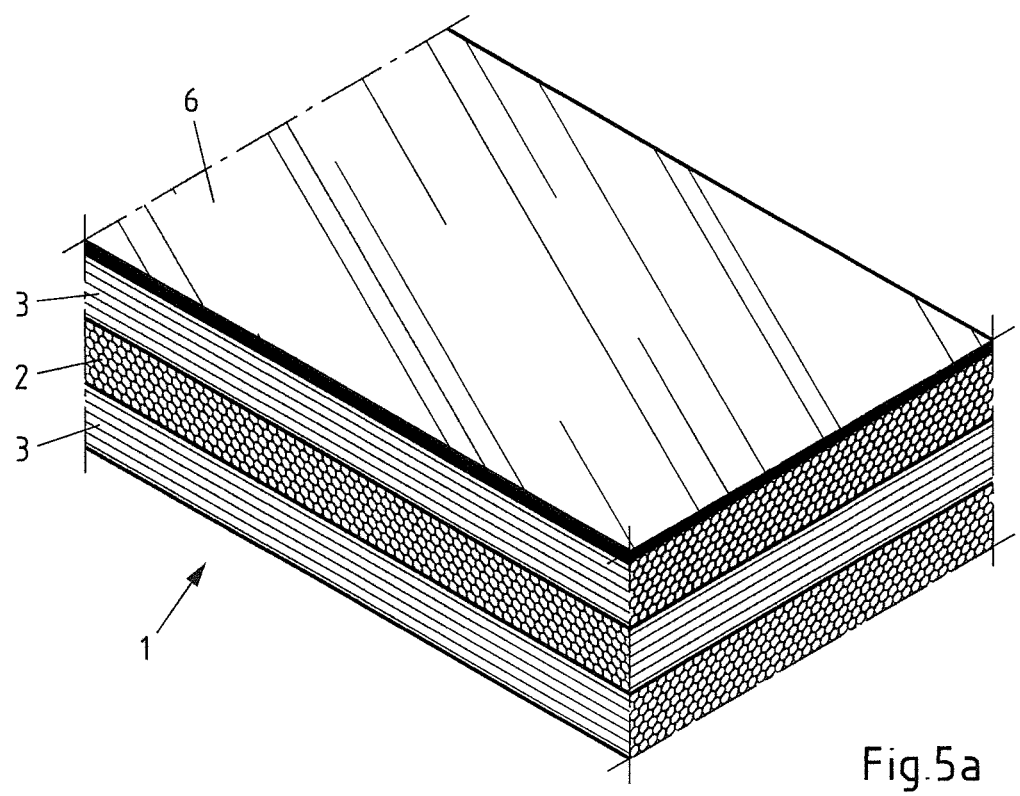
FIG. 5a shows a schematic and perspective depiction of a multilayer composite made of three superposed plies of fibre composite and an additional material ply on an outer ply of fibre composite.
Figure 5B:
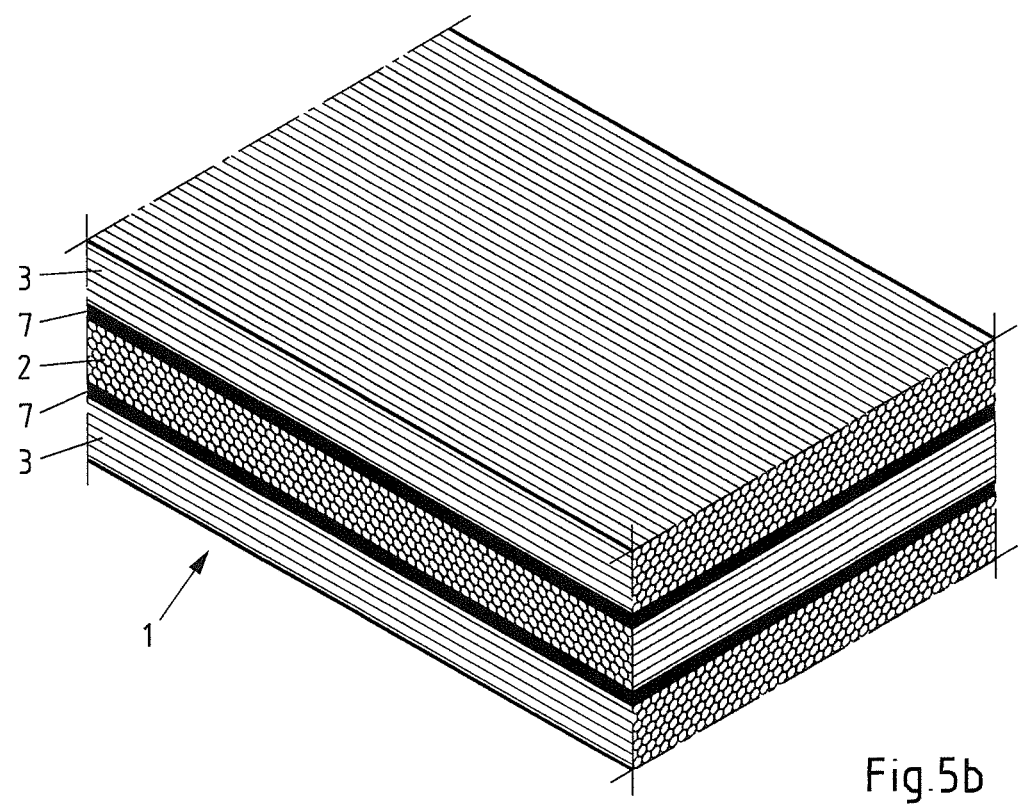
FIG. 5b shows a schematic and perspective depiction of a multilayer composite made of three superposed plies of fibre composite and two additional inner further material plies, for example plastic layers, wherein an inner further material ply is located between each outer ply of fibre composite and the inner ply of fibre composite.
Figure 6:
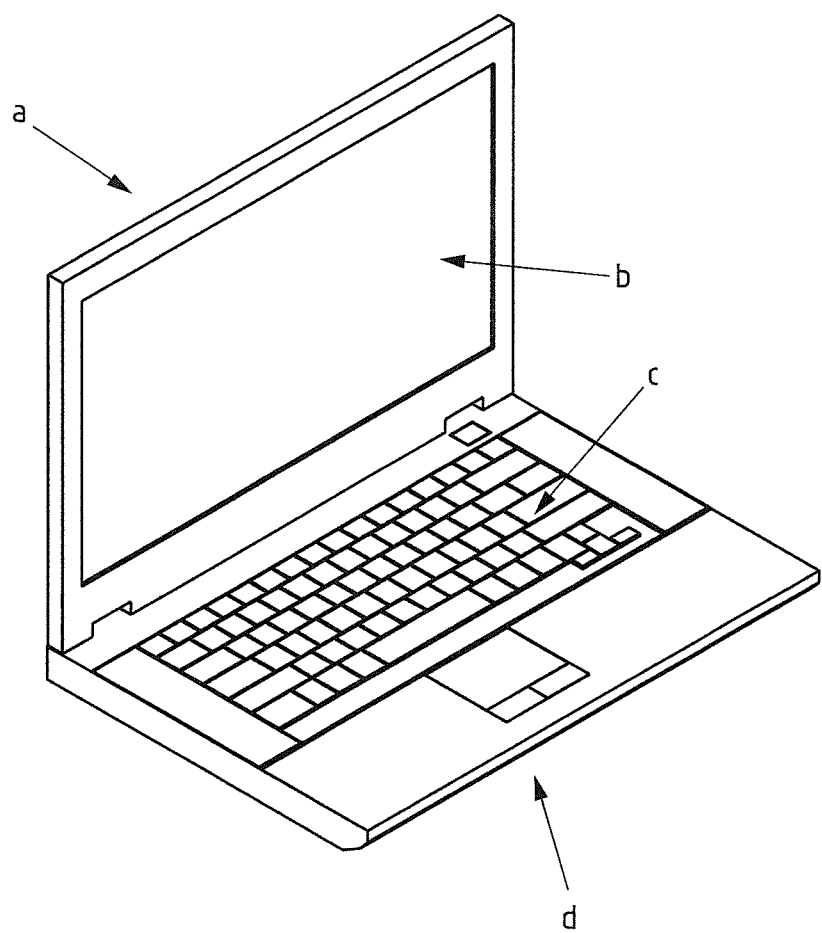
FIG. 6 shows a schematic and perspective depiction of a laptop.

1: multilayer composite
2: inner plies of fibre composite
3: outer plies of fibre composite
4: endless fibre
5: polycarbonate-based plastic
6: further outer material ply
7: further inner material ply
a: laptop monitor backside
b: laptop monitor
c: laptop keyboard
d: laptop underside The invention is hereinafter more particularly elucidated with reference to examples.

EXAMPLES

1. Description of Raw Materials and Test Methods
Component A
Linear polycarbonate based on bisphenol A having a melt volume flow rate MVR of 6.0 cm$^3$/10 min (as per ISO 1133 at a test temperature of 300° C. and 1.2 kg loading).

Component B

Pyrofil TRH50 60M carbon fibre from Mitsubishi Rayon CO., LtD. having an individual filament diameter of 7 μm, a density of 1.81 g/cm$^3$ and a tensile modulus of 250 GPa. 60,000 individual filaments are obtained in a roving as an endless spool.

Methods of Measurement

The methods detailed hereinafter for determining the relevant parameters were employed for performing/evaluating the examples and are also the methods for determining the parameters relevant in accordance with the invention in general.

Determination of Thickness and Thickness Ratio

The thickness determination of the fibre composite plies and of the multilayer composites that result after joining was effected using a commercially available micrometer. The reported result was the arithmetic mean of 5 individual measurements at different positions.

The thickness ratio of the two outer fibre composite plies to the sum of the inner fibre composite plies may be determined in the course of production by determination of the individual thicknesses of the plies of fibre composite prior to the joining of the plies to afford the multilayer composite. Practical tests have shown that in the customary processes for joining the plies (for example lamination under the action of pressure and heat) the ratio of the thicknesses to one another does not substantially change even in the case of compression and concomitant reduction in thicknesses. The thickness ratios described here relate to the individual thicknesses of the plies of fibre composite determined in the course of production before joining of the plies to afford the multilayer composite.

Alternatively, the determination of the thickness ratio may also be effected in the finished multilayer composite. This is achieved by examination of a cross section of the material by microscopy. The change in orientation of the fibre running direction upon transition from the inner to the two outer plies of fibre composite makes these plies readily identifiable by microscopy. For layer thickness determination a plane running parallel to the planes determined by the fibre running direction halfway between the last endless fibre belonging to an outer ply of the fibre composite and the first endless fibre belonging to an inner ply of the fibre composite is used as the layer boundary.

Void Content Determination

The void content was determined by means of the thickness difference method as described above on the test specimens previously joined by means of an interval heating press. Determination of the actual specimen thickness was effected at 5 points of measurement distributed over the component. Computation of the void content used the arithmetic mean of the 5 individual determinations of the actual sample thickness.

Determination of Waviness Parameters

The waviness parameters on surfaces were determined using a KLA Tencor P16+™ instrument using Profiler 7.21 control software and Apex 3D evaluation software.

Differentiation between roughness profile and waviness profile from the determined primary profile was effected by utilization of a digital Gaussian filter as per DIN EN ISO 11562:1998 with a threshold wavelength of 0.08 mm.

The waviness profile was used to calculate arithmetic mean waviness (Wa), quadratic mean waviness (Wq) and the total height of the waviness profile over the calculation length (Wt) as defined in DIN EN ISO 4287:2010.

A tracking weight of the sensor of 2 mg and a feed rate of the sensor of 200 μm/sec were chosen for determination of the parameters. The measurement distance was 30 mm in each case. The computation length corresponded to the measurement distance.

The parameters reported hereinbelow were meaned from 3 individual measurements orthogonal to the fibre orientation. The measurements were taken at room temperature (23° C.).

Flexural Modulus of Elasticity

To determine the flexural modulus of elasticity 5 test specimens per orientation (0°, 90°) were first prepared from the produced multilayer composite sheets with a Mutronic Diadisc 5200 cut-off saw using Dia cutting discs CFK fine blades. An outside micrometer was then used to determine the exact specimen dimensions (width and thickness) relevant for the tests. The test was performed as per ASTM D790-10 method A. The slope of the resulting force-distance diagram corresponds to the flexural modulus of elasticity. The reported result was the arithmetic mean of the 5 individual measurements.

Determining Fibre Volume Content

In the present process the fibres are passed through the thermoplastic melt at a constant wetting rate. The fibre volume content of a fibre composite ply is thus calculated from the difference in the melt volume flow of the thermoplastic melt and the product of the production rate of the fibre composite ply and the cross section of the fibre composite ply to be produced.

2. Production and Results

Production of the Fibre Composite Plies

Production of the fibre composite ply from the above-described components A and B was effected according to the process described in DE 10 2011 005 462 B3. The dry fibre band composed of spread rovings was heated to a temperature of about 220° C. before the molten polymer was applied to both sides of the plane of the dry fibre band. Once application of pressure-shear vibration had been effected the following compositions of the fibre composite plies were obtained as an endless tape.

TABLE 1

Overview of properties of the individual fibre composite plies

| composite ply | content of component A in [vol %] | content of component B in [vol %] | layer thickness in [μm] |
| --- | --- | --- | --- |
| 1 | 63 | 37 | 230 |
| 2 | 55 | 45 | 150 |
| 3 | 55 | 45 | 180 |
| 4 | 55 | 45 | 190 |
| 5 | 53 | 47 | 190 |
| 6 | 57 | 43 | 210 |
| 7 | 50 | 50 | 185 |
| 8 | 50 | 50 | 180 |

Production of the Multilayer Composites

Test specimens of multilayer composite used for further characterization were obtained by specific layup of the fibre composite plies in the following orientations.

TABLE 2

Overview of type, orientation and number of employed fibre composite plies in the multilayer composites

| test specimen | inner plies | | | outer plies | | |
|---|---|---|---|---|---|---|
| | composite ply | orientation | total number | composite ply | orientation | total number |
| A (comp.) | 4 | 90° | 3 | 4 | 0° | 2 |
| B | 3 | 90° | 4 | 3 | 0° | 2 |
| C | 5 | 90° | 4 | 2 | 0° | 2 |
| D (comp.) | 7 | 90° | 2 | 1 | 0° | 2 |
| E (comp.) | 7 | 90° | 2 | 6 | 0° | 2 |
| F (comp.) | 7 | 90° | 2 | 7 | 0° | 2 |
| G | 8 | 90° | 4 | 1 | 0° | 2 |
| H | 8 | 90° | 4 | 6 | 0° | 2 |
| I | 8 | 90° | 4 | 8 | 0° | 2 |

After layup the test specimens were semicontinuously interjoined in an interval heating press. The surficially applied moulding pressure was 10 bar. The temperature in the heating zone was 280° C. and the temperature in the cooling zone was 100° C. Furthermore, the feed per cycle was 30 mm and the cycle time was 10 sec. The thicknesses of the individual tape specimens were retained after joining to afford a test specimen.

Results of Waviness Profile Measurement

TABLE 3

Parameters for multilayer composites having different ply constructions

| test specimen | number of plies | Wa [in µm] | Wq [in µm] | Wt [in µm] | thickness ratio Σ of outer plies/Σ of inner plies |
|---|---|---|---|---|---|
| D (comp.) | 4 | 8.58 | 10.58 | 60.10 | 1.24 |
| F (comp.) | 4 | 9.35 | 11.81 | 65.27 | 1.00 |
| G | 6 | 7.31 | 9.05 | 52.90 | 0.64 |
| H | 6 | 6.89 | 8.70 | 54.97 | 0.58 |
| I | 6 | 7.38 | 9.13 | 55.47 | 0.50 |

The comparison of the comparative examples (D, F) with the inventive examples (G-I) shows that for a thickness ratio of the sum of the two outer plies to the sum of all inner plies of less than 0.65 markedly lower parameters are achieved for the arithmetic and quadratic average waviness (Wa, Wq) and for the total height of the waviness profile (Wt), resulting in improved optics, smoothness and an improved coatability of the surfaces.

Results of Flexural Modulus of Elasticity and Void Content Determination

TABLE 4

Flexural modulus of elasticity in 0° and 90° orientation of multilayer composites having different layer constructions

| test specimen | flexural modulus of elasticity in 90° orientation in [GPa] | flexural modulus of elasticity in 0° orientation in [GPa] | test specimen thickness in [µm] | void content in [%] |
|---|---|---|---|---|
| A (comp.) | 11.4 | 77.9 | 950 | <0.5 |
| B | 30.2 | 64.5 | 1080 | <0.5 |
| C | 37.5 | 55.9 | 1060 | <0.5 |
| D (comp.) | 12.3 | 71.9 | 830 | <0.5 |
| E (comp.) | 14.1 | 80.9 | 790 | <0.5 |
| F (comp.) | 15.3 | 97.2 | 740 | <0.5 |
| G | 28.1 | 66.9 | 1280 | <0.5 |
| H | 28.0 | 72.3 | 1200 | <0.5 |
| I | 32.4 | 75.8 | 1080 | <0.5 |

The tests show that the inventive multilayer composites B, C, D, G, H and I exhibit a sufficient flexural modulus of elasticity both in the 90° orientation and in the 0° orientation, whereas the comparative specimens A, D, E and F in 90° orientation in each case exhibit too low a flexural modulus of elasticity. This ensures that the inventive specimens are resistant to a multiaxial load, such as a dropping of the relevant component or an unintentional surficial loading. It is all the more evident that the content of voids is minimized by the production process and is below 0.5 for all specimens tested.

The invention claimed is:

1. A multilayer composite comprising at least three superimposed plies of fibre composite which are defined relative to one another as two outer plies of fibre composite and at least one inner ply of fibre composite, wherein
    (a) each of these at least three plies of fibre composite comprises endless fibres, wherein
        the endless fibres within the respective ply are unidirectionally aligned and
        are embedded in a polycarbonate-based plastic, wherein the polycarbonate is selected from homopolycarbonate or copolycarbonate,
    (b) the inner plies of fibre composite have substantially the same orientation and their orientation relative to the outer plies of fibre composite is rotated by 30° to 90°, wherein the orientation of a ply of fibre composite is determined by the orientation of the unidirectionally aligned fibres present therein,
    and wherein the thickness ratio of the sum of the two outer plies to the sum of all inner plies of fibre composite is 0.3 to 0.65, and wherein the outer plies have a fiber content of not more than 42% by volume.

2. The multilayer composite according to claim 1, wherein the fibre composite plies are obtainable by applying a molten polycarbonate-based plastic onto a dry fibre band preheated to above the glass transition temperature of the plastic, wherein the applying is effected under application of pressure-shear vibration and wherein the polycarbonate is selected from homopolycarbonate or copolycarbonate.

3. The multilayer composite according to claim 1, wherein the at least three plies of fibre composite are arranged in substantially symmetrical fashion, wherein the two outer plies of fibre composite have a substantially identical construction in terms of at least one feature from the group comprising chemical composition, fibre volume content and layer thickness.

4. The multilayer composite according to claim 1, wherein the multilayer composite has a total thickness in the range from 0.5 mm to 2 mm.

5. The multilayer composite according to claim 1, wherein the thickness ratio of the sum of the two outer plies to the sum of all inner plies of fibre composite is 0.35 to 0.58.

6. The multilayer composite according to claim 1, wherein the multilayer composite comprises three to six inner fibre composite plies.

7. The multilayer composite according to claim 1, wherein the inner plies of fibre composite have the same orientation and their orientation relative to the outer plies of fibre composite is rotated by 90°±5°.

8. The multilayer composite according to claim 1, wherein the at least three plies of fibre composite comprise essentially no voids.

9. The multilayer composite according to claim 1, wherein the endless fibres are selected from the group comprising glass fibres, carbon fibres, basalt fibres, aramid fibres, liquid crystal polymer fibres, polyphenylene sulphide fibres, polyether ketone fibres, polyether ether ketone fibres, polyether imide fibres and mixtures thereof.

10. A process for producing a multilayer composite according to claim 1, comprising the steps of
providing at least one inner ply of fibre composite and two outer plies of fibre composite, wherein the production of the individual fibre composite plies is effected by applying a molten polycarbonate-based plastic onto a dry fibre band preheated to above the glass transition temperature of the plastic, wherein the applying is effected under application of pressure-shear vibration and wherein the polycarbonate is selected from homopolycarbonate or copolycarbonate,
introducing the at least one inner ply of fibre composite between the outer fibre composite plies, wherein the inner plies of fibre composite have the same orientation and their orientation relative to the outer plies of fibre composite is rotated by 30° to 90°,
joining the layered plies of fibre composite to afford the multilayer composite.

11. An electronic device or housing part suitable for use as or employment in a housing of an electronic device, wherein the electronic device or housing part comprises a multilayer composite according to claim 1.

12. The electronic device according to claim 11, wherein the electronic device is a monitor, tablet, mobile telephone or a computer.

13. The housing part according to claim 11, wherein the housing of an electronic device is the monitor backside or the underside of a laptop.

* * * * *